United States Patent [19]

Mikami et al.

[11] Patent Number: 5,436,819
[45] Date of Patent: Jul. 25, 1995

[54] APPARATUS FOR AND METHOD OF COMPENSATING FOR AN OUTPUT VOLTAGE ERROR IN AN INVERTER OUTPUT

[75] Inventors: Nobuhiro Mikami; Toshio Morohoshi, both of Aichi, Japan

[73] Assignee: Mitsubishi Denki Kabushiki Kaisha, Tokyo, Japan

[21] Appl. No.: 915,346

[22] Filed: Jul. 20, 1992

[30] Foreign Application Priority Data

Jul. 25, 1991 [JP] Japan .................................. 3-186336
Oct. 30, 1991 [JP] Japan .................................. 3-284583
Dec. 27, 1991 [JP] Japan .................................. 3-347291

[51] Int. Cl.6 .......................................... H02M 1/12
[52] U.S. Cl. .......................................... 363/41; 363/58; 363/98; 363/132
[58] Field of Search ................. 363/41, 58, 98, 132; 318/811; 388/811

[56] References Cited

U.S. PATENT DOCUMENTS 4,878,163 10/1989 Yamato et al. ................... 363/41 X
4,969,079 11/1990 Kiriyama et al. .
5,072,354 12/1991 Katto et al. ............................. 363/41

Primary Examiner—Thomas M. Dougherty
Assistant Examiner—Shawn Riley
Attorney, Agent, or Firm—Sughrue, Mion, Zinn, Macpeak & Seas; Richard C. Turner

[57] ABSTRACT

The present invention provides an apparatus for and a method of compensating an output voltage error of an inverter that changes direct current (DC) power into alternating current (AC) power. More specifically, the present invention provides an apparatus for and a method of compensating for an output voltage error by detecting the polarity of output current from an inverter used to change DC power into AC power. In accordance with one embodiment of the present invention, a current detector is used to detect the output current of the inverter circuit. A polarity discriminating device, receiving the detected output current, sets a threshold current value that is to be used to accurately determine the polarity of the output current. As the output voltage error has the same phase but is opposite in polarity relative to the current output by the inverter, an accurate detection of the output error can be made by accurately detecting the output current polarity. The output current polarity is accurately determined by setting the threshold current values higher than the ripples occurring at the zero current value.

16 Claims, 12 Drawing Sheets

APPARATUS FOR AND METHOD OF COMPENSATING FOR AN OUTPUT VOLTAGE ERROR IN AN INVERTER OUTPUT

BACKGROUND OF THE INVENTION

1. Field of the Invention

The present invention relates to an output voltage error compensator for detecting and minimizing an output voltage error. More specifically, the present invention is directed to an apparatus for and a method of detecting and minimizing an output voltage error of an inverter output voltage during a short-circuit prevention period of the inverter.

2. Description of the Background Art

FIG. 10 is a block diagram illustrating a control circuit for use in a conventional inverter output voltage error compensator as shown in, for example, Japanese Patent Publication No. 7071/1991. In this figure, an inverter main circuit 1, which is composed of transistors connected in a bridge-configuration, as is well known in the art, changes input direct current (DC) power from a DC power supply 4 into output alternating current (AC) power. The transistors of the main circuit 1 are partitioned into two groups, referred to hereinafter as upper and lower arm transistors, used to output respective portions of the AC power. The output of the main circuit 1 is received by an AC filter composed of inductor 2 and capacitor 3, and then transferred to load 5. A current detector 6 is connected in series with the AC filter, and delivers an indication of the output current of the main circuit 1 to a comparator circuit 11.

The comparator circuit 11 operates as a polarity discriminating device for discriminating the polarity of the output current detected by the current detector 6. The comparator circuit 11 outputs a signal to a polarity reversing circuit 13. This reversing circuit 13 also receives an input from a DC voltage sensor 12, which is used to detect the voltage level of the DC power supply 4.

An AC reference voltage generator circuit 8 is provided for generating a sinusoidal reference signal. An amplifier 9 amplifies the reference signal and outputs the resulting signal to a pulse-width modulator (PWM) circuit 10, which is composed of comparator circuit 10a and triangle-wave generator 10b used to generate a carrier wave for the pulse train output from the circuit 10. The output from the circuit 10 is used by drive circuit 7 to drive the main inverter circuit 1, as is well known in the art.

In operation, a sinusoidal wave output voltage is output to the load 5, as it appears across the terminals of the capacitor 3 in accordance with the control output of the PWM circuit 10. That is, the amplifier 9 and PWM circuit 10 operate to alternately switch the bridge-configured transistors in the inverter main circuit 1 so that the output of the main circuit 1, as filtered by the AC filter, matches the sinusoidal reference voltage generated by the AC reference voltage generator 8.

Ideally, the bridge-configured transistors operate to switch instantaneously when driven. However, in practice, the transistors experience some switching delay between ON and OFF states. Thus, the main circuit 1 is subject to a short-circuit condition that results when both the upper and lower arm transistors are in the ON state. This short-circuit condition may cause a current surge (overcurrent) to damage one or more of the transistors in the main circuit 1.

In order to prevent overcurrent damage, the control circuit must switch both transistor arms OFF for a certain period of time Tb to stop the inverter output voltage. The period of time Tb is known as the short-circuit prevention period. By switching the transistors of the main circuit 1 OFF during the short-circuit prevention period Tb, the inherent delay in switching between the drive signals shown in FIGS. 11(b) and 11(c), and the ideal PWM output signal shown in FIG. 11(a) will not cause overcurrent damage of the bridge-configured transistors of the main circuit 1.

Although the short-circuit prevention period Tb is successful in preventing overcurrent damage, the switching off of the main circuit transistors creates a difference between the actual inverter output voltage value and the ideal inverter voltage value. This difference in values is known as the voltage error $\Delta V$. Namely, when a current flows from the inverter to the load, the actual output voltage (FIG. 11(e)) is less than the ideal output voltage (FIG. 11(a)) due to the short-circuit prevention period Tb (the difference being shown as the hatched area in FIG. 11(e)). Conversely, when a current flows from the load to the inverter, the actual output voltage (FIG. 11(d)) is more than the ideal output voltage due to the short-circuit prevention period (as shown in the hatched area of FIG. 11(d)). In either case, an voltage error takes place, resulting in the actual voltage, as indicated by a long and short dashed line in FIG. 12, deviating from the ideal sine-wave voltage signal, shown as the short dashed line in FIG. 12.

The average voltage error is equivalent to a time-averaged difference between the area of the actual inverter output voltage waveform and that of the ideal inverter output voltage waveform. The average voltage error is also proportional to the DC power supply voltage. During the short-circuit prevention period Tb, the average voltage error is in phase with and opposite in polarity to the inverter output current (shown as the solid line in FIG. 12).

The control circuit of FIG. 10 compensates for the average voltage error amount appearing in the output voltage of the inverter main circuit 1 by first detecting the inverter output current using current detector 6 and discriminating the polarity of the output current using comparator circuit 11. Next, the control circuit detects the voltage level of the DC power supply 4 using the DC voltage sensor 12 and provides the level signal to the polarity reversing circuit 13. The reversing circuit 13 operates to reverse the polarity of the level signal output from the voltage sensor 12 whenever the comparator 11 outputs a signal indicating that the output current of the main circuit 1 has a negative polarity. In effect the comparator circuit 11 detects the polarity of the average voltage error because the output current is opposite in polarity to the average voltage error. By detecting the polarity of the average voltage error, the polarity reversing circuit 13 can output a level signal opposite in polarity to the average voltage error as an offset or compensation error signal. This compensation error signal is output to the PWM circuit 10 to automatically compensate for the average voltage error included in the actual inverter output voltage of the main circuit 1.

As stated above, the control circuit discriminates the polarity of the inverter output current by judging whether the direction of the output current is positive or negative with respect to a zero current. Because the current actually output by the inverter has ripples, as shown in FIG. 2B, chattering occurs in the vicinity of the zero current. Thus, the detection of the polarity cannot be accurately made. As a result, the control circuit cannot properly compensate for the average output voltage error using the construction described above. An additional problem with the known control circuit is that a mismatch between a period when the transistors of the main circuit are actually off and the ideal short-circuit prevention period Tb are caused by delays in the switching of the transistors due to increases or decreases in the current supplied from the main circuit 1 to the load 5.

SUMMARY OF THE INVENTION

An object of the present invention is to overcome the disadvantages and problems in the conventional designs by providing an apparatus for and a method of compensating an output voltage error of an inverter that changes direct current (DC) power into alternating current (AC) power.

In order to achieve the above and other objects of the present invention, there is provided an apparatus for and a method of compensating for an output voltage error by detecting the polarity of output current from an inverter used to change DC power into AC power. In accordance with one embodiment of the present invention, a current detector is used to detect the output current of the inverter circuit. A polarity discriminating device, receiving the detected output current, sets a threshold current value that is to be used to accurately determine the polarity of the output current. As the output voltage error has the same phase but is opposite in polarity relative to the current output by the inverter, an accurate detection of the output error can be made by accurately detecting the output current polarity. The output current polarity is accurately determined by setting the threshold current values higher than the ripples occurring at the zero current value.

In accordance with another embodiment of the present invention, an output voltage error compensator device compensates the output voltage error by using a compensation factor corresponding to the time the upper and lower arm transistors in the inverter are actually simultaneously in their OFF states.

In accordance with yet another embodiment of the present invention, an output voltage error compensator device compensates for the output voltage error by taking into account the voltage drop appearing across the circuit components of the inverter.

In accordance with still another embodiment of the present invention, an output voltage error compensator device compensates for output voltage error by detecting either the output current or voltage polarity.

DESCRIPTION OF THE PREFERRED EMBODIMENTS

Figure 1:
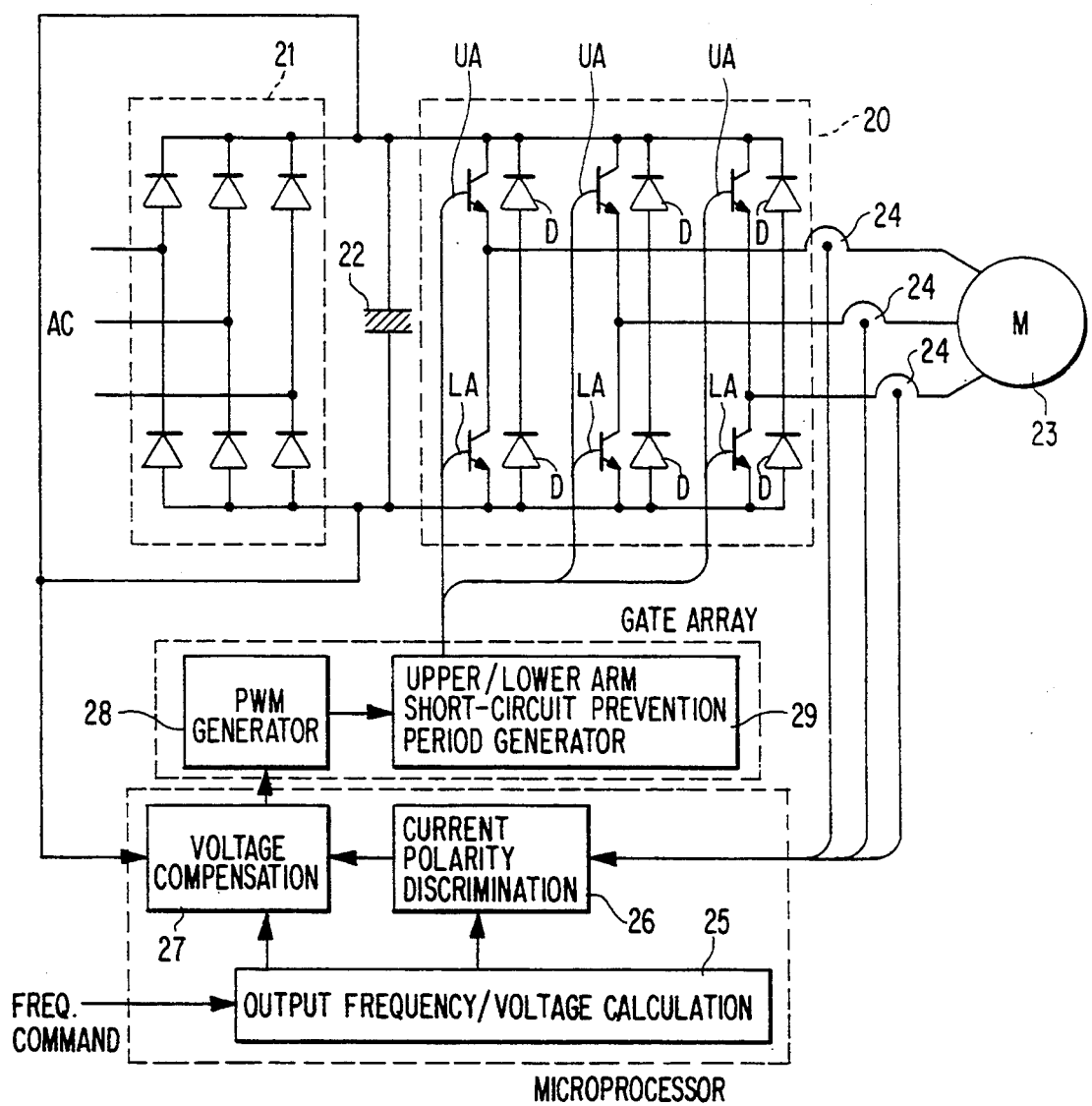
FIG. 1 is a block diagram of a control circuit in an output voltage error compensator for use in an inverter in accordance with the present invention.

FIG. 1 is a circuit diagram showing one embodiment of an output voltage error compensator according to the present invention. In the circuit diagram, an inverter main circuit 20 is used to change input direct current (DC) power into output alternating current (AC) power. A converter circuit 21 converts AC power into DC power for input to the inverter main circuit 20 after smoothing by capacitor 22. The transistors of the main circuit 20 receiving the smoothed DC power are partitioned into two groups, referred to hereinafter as upper and lower arm transistors UA and LA, respectively, and are used to output respective portions of the AC power. The output of the main circuit 20 is transferred to a load, which in the preferred embodiment is a three-phase induction motor 23. In alternative embodiments, the motor may have a single or multiple phases. A current detector 24 is connected in series with the inverter main circuit 20, and delivers an indication of the output current of the main circuit 20 to a polarity discriminating device 26.

The polarity discriminating device 26 operates to discriminate the polarity of the output current detected by the current detector 24. The polarity discriminating device 26 outputs a signal to a voltage compensator device 27. The voltage compensator device 27 also receives an input regarding the DC voltage level of the capacitor 22. The voltage compensator device 27 compensates for a precalculated output voltage in accordance with the voltage error calculated from the DC voltage of the converter 21 and the output of the polarity discriminating device 26. The precalculated output voltage is output by a calculating device 25, which calculates the output frequency and voltage of the inverter main circuit 20 on the basis of an external input frequency command. The calculating device 25, polarity discriminating device 26, and the voltage compensator device 27, can together be implemented in a single microprocessor or the like.

A pulse-width modulator (PWM) circuit 28 generates PWM signals in accordance with the compensated output voltage. The PWM signals are received by an upper/lower arm short-circuit prevention period generator 29 that is used to set the upper/lower arm short-circuit prevention period of the inverter main circuit 20 in accordance with the output of the PWM circuit. The PWM circuit 28 and the short-circuit prevention period generator 29 may be implemented by a gate array or the like.

In operation, the AC signal input to the converter 21 is converted into a DC signal, smoothed by the capacitor 22, and transferred to the inverter main circuit 20, where the bridge-configured transistors UA, LA are driven in accordance with a drive signal output by the upper/lower arm short-circuit prevention period generator 29. The transistors are driven to convert the DC signal into an AC signal having a predetermined frequency and voltage, as calculated by calculating device 25 and subsequently compensated by voltage compensator device 27. The signal thus produced is then applied to the induction motor 23.

Figure 4:
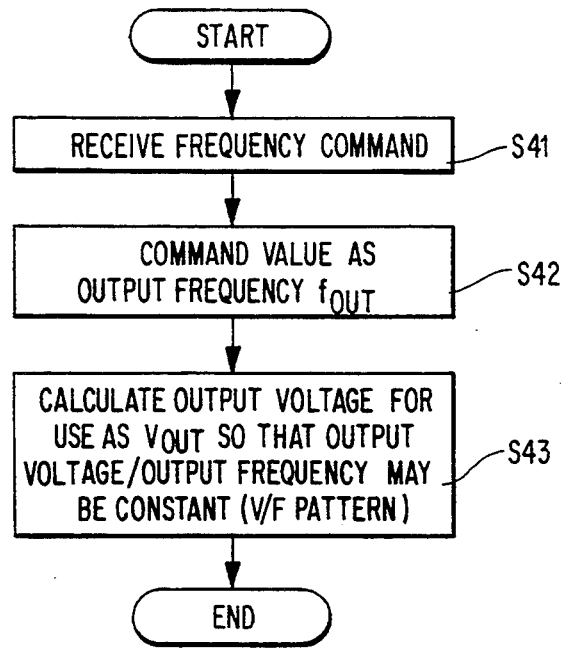
FIG. 4 is a flowchart showing the operation of an output frequency/voltage calculating device according to the present invention.

During the operation, the output current of the inverter main circuit 20 is detected by the current detector 24 and its output is sent to the current polarity discriminating device 26. In the meantime, in accordance with the flowchart shown in FIG. 4, the calculating device 25 receives an external frequency command signal (step S41), and employs the representative command value thereof as an output frequency ($f_{OUT}$) for the inverter main circuit 20 (step S42). The calculating device 25, then calculates an output voltage ($V_{OUT}$) on the basis of that output frequency so that the ratio of $V_{OUT}/f_{OUT}$ will be constant (step S43). Thus, as the input frequency command increases in value, the calculated output voltage increases. After making the calculation, the calculating device 25 outputs the $f_{OUT}$ information to the polarity discriminating device 26, while it outputs the $V_{OUT}$ to the voltage compensator device 27.

Figure 2A:
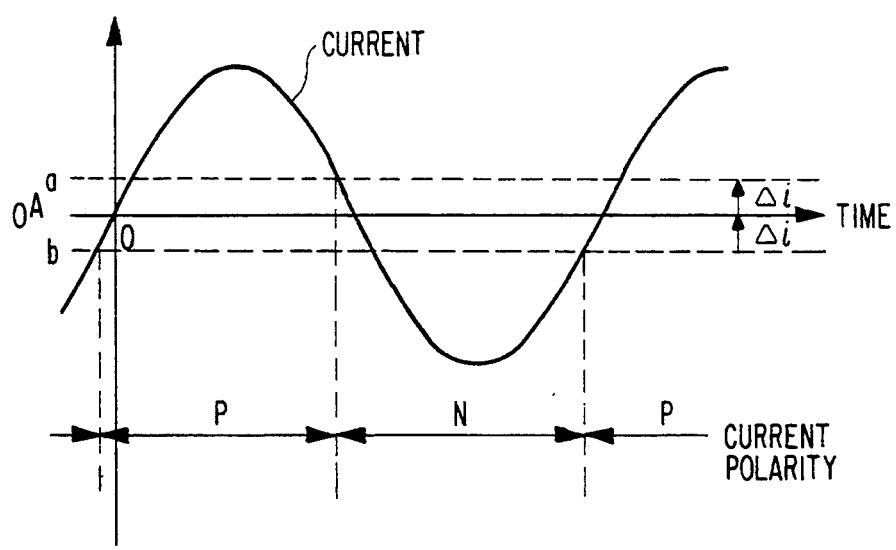
FIG. 2A is a waveform diagram showing the output current of an inverter main circuit according to the present invention.
Figure 2B:
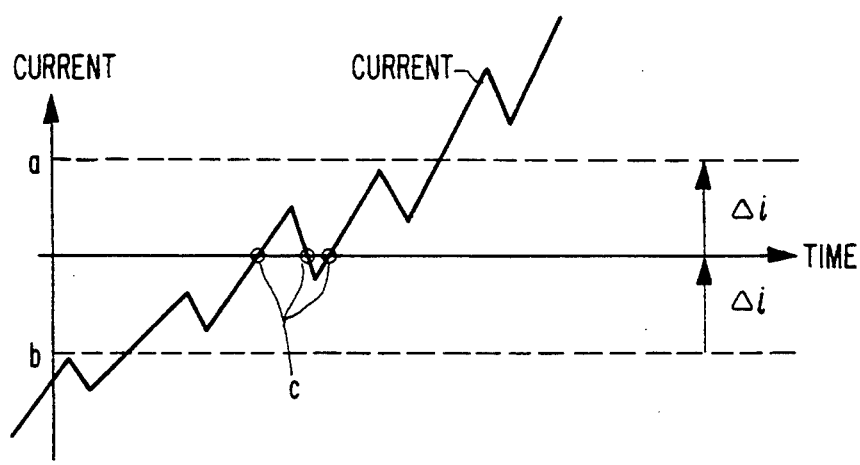
FIG. 2B is a waveform diagram showing the output current of a known inverter main circuit.
Figure 3:
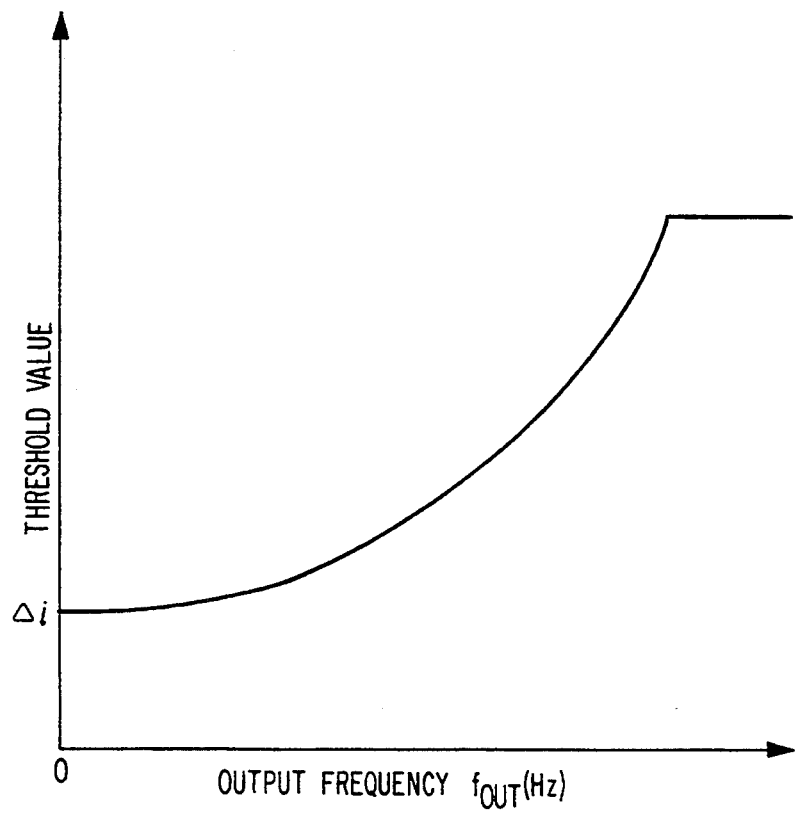
FIG. 3 illustrates a relationship between an output frequency and a threshold current value according to the present invention.
Figure 5:
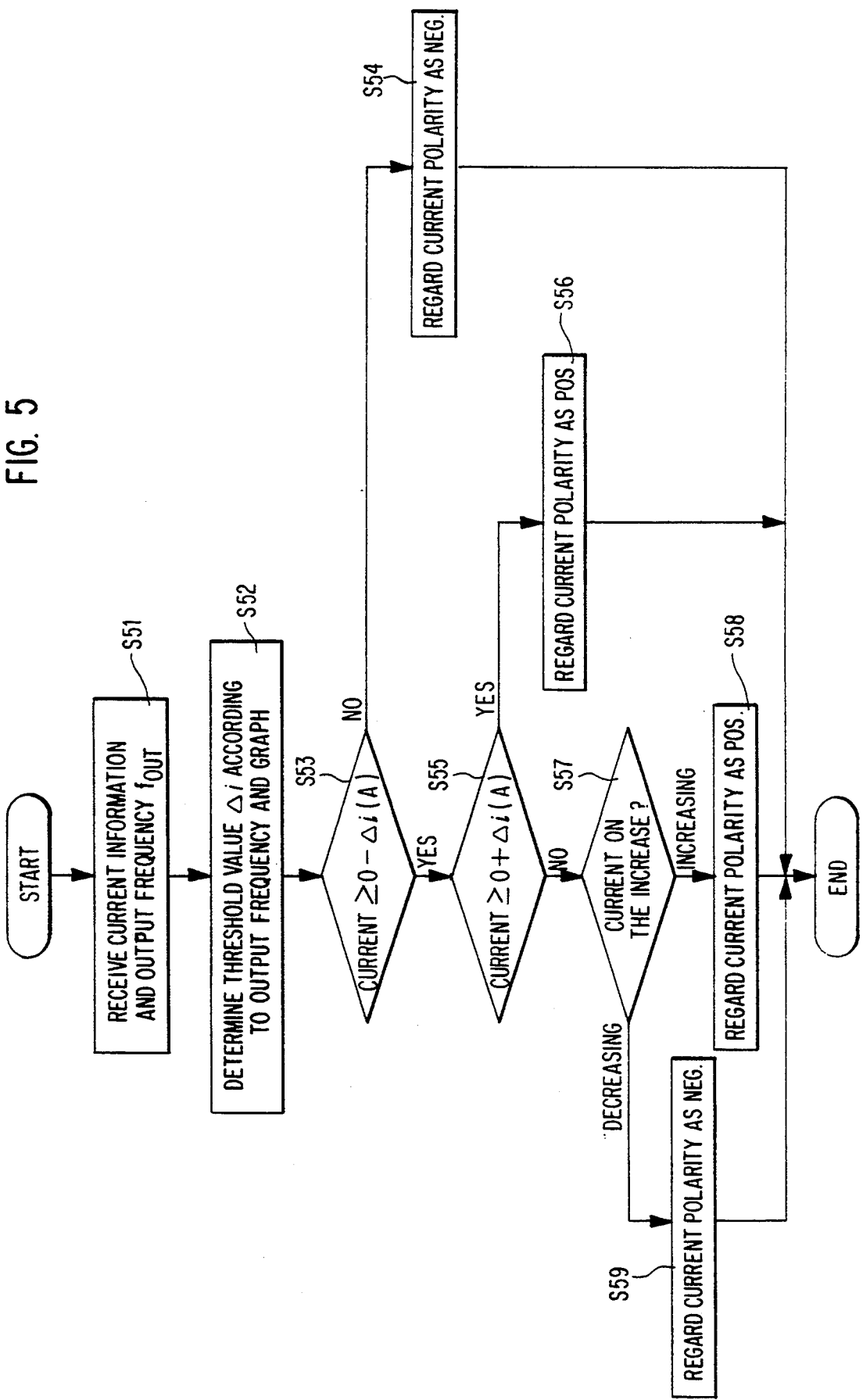
FIG. 5 is a flowchart showing the operation of a current polarity discriminating device according to the present invention.

With reference to the flowchart shown in FIG. 5, the current polarity discriminating device 26 determines a threshold value $\Delta i$ after receiving the positive/negative information of the output current from the current detector 24 (step S51), and after receiving the output frequency $f_{OUT}$ information from the calculating device 25. The current polarity discriminating device 26 determines the threshold value $\Delta i$ based on a relationship with the output frequency $f_{OUT}$, as shown in FIG. 3 (step S52). The polarity discriminating device 26 uses the $\Delta i$ thus determined to set output current threshold values a and b increased and decreased respectively from a zero current value, as shown in FIG. 2A. By making this threshold value $\Delta i$ larger than ripples in the output current according to the size of the ripples, chattering can be prevented. The size of the ripples change as the output frequency changes. Specifically, as the output frequency increases, the size of the ripples increases.

Next, the polarity discriminating device 26 determines whether the output current value, as detected by current detector 24, is larger than the negative threshold value b (step S53). If the output current value is smaller, the current polarity is determined to be negative (step S54). If the output current value is larger than b, a further determination is made as to whether the output current value is larger than the positive threshold value a (step S55). If the output current value is larger than a, the current polarity is considered positive (step S56). If the output current value is between the two threshold values a and b, the polarity discriminating device 26 determines whether the output current is increasing or not (step S57). If the output current is on the increase, the current polarity is regarded as positive (step S58). Conversely, if the output current is on the decrease, the current polarity is considered negative (step S59).

Figure 6:
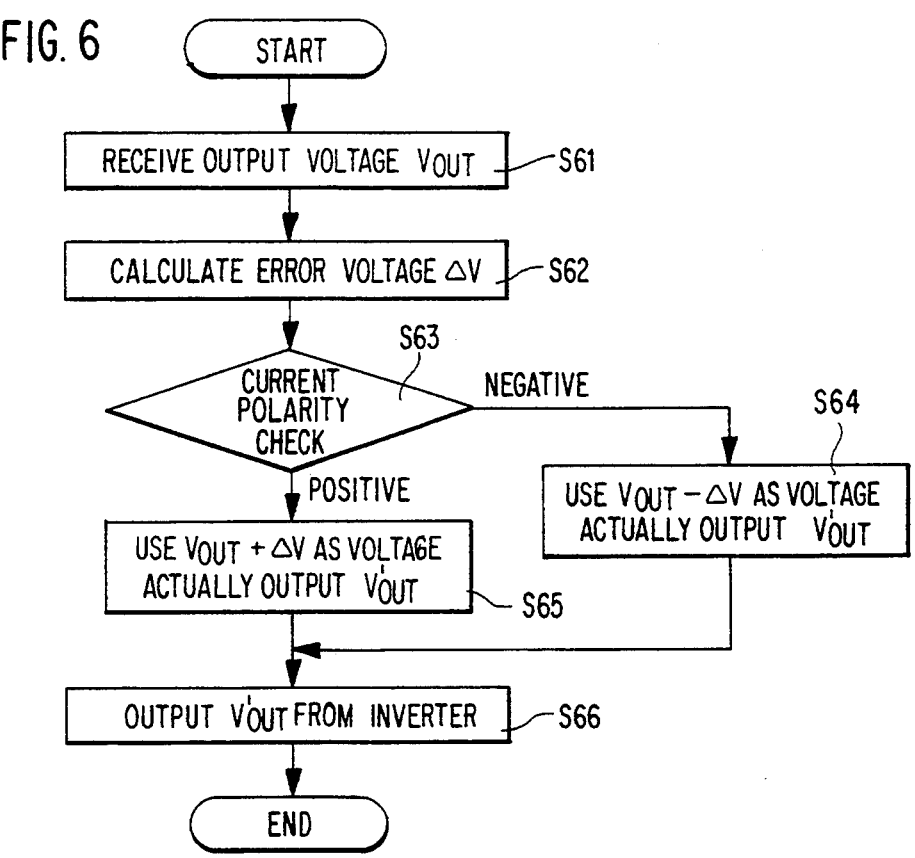
FIG. 6 is a flowchart showing the operation of a voltage compensator device according to the present invention.

As shown in the flowchart of FIG. 6, the voltage compensator device 27 first receives the calculated output voltage $V_{OUT}$ from the calculating device 25 (step S61), and calculates the voltage error $\Delta V$ from the upper/lower arm short-circuit prevention period Tb preset in response to the inverter main circuit 20, the carrier frequency fc, and the DC voltage $V_{DC}$ (step S62), using the following equation:

$$\Delta V = Tb \times V_{DC} \times fc \tag{1}$$

The voltage compensator device 27 then checks the polarity of the output current, i.e., the output of the current polarity discriminating device 26 (step S63). As discussed above, the output voltage error has a polarity opposite of the output current. Thus, by detecting the polarity of the output current, in effect, the voltage compensator detects the polarity of the output voltage error included in the actual output voltage of the inverter main circuit 20. If the polarity of the output current is positive, the voltage compensator device 27 compensates for the output voltage error by employing a voltage $V_{OUT} + \Delta V$ as the voltage to be actually output by the inverter main circuit 20 ($V'_{OUT}$) (step S65).

If the polarity of the output current is negative, $V_{OUT} - \Delta V$ is used as the voltage actually output by the inverter main circuit 20 ($V'_{OUT}$) (step S64).

After the voltage compensator device 27 has compensated for the output voltage error as described above, the PWM circuit 28 and the short-circuit prevention period generator generate and output the upper/lower arm short-circuit prevention period in accordance with the compensated voltage value so that the inverter main circuit 20 may on average output the predetermined voltage in the positive and negative regions (step S66). Thus, in accordance with the present embodiment, the polarity of the output current of an inverter can be accurately detected irrespective of the chatter occurring in the zero current range due to ripples in the output current. With the accurate detection of polarity, an accurate detection and compensation of the output voltage error is achieved using the present invention.

Figure 7:
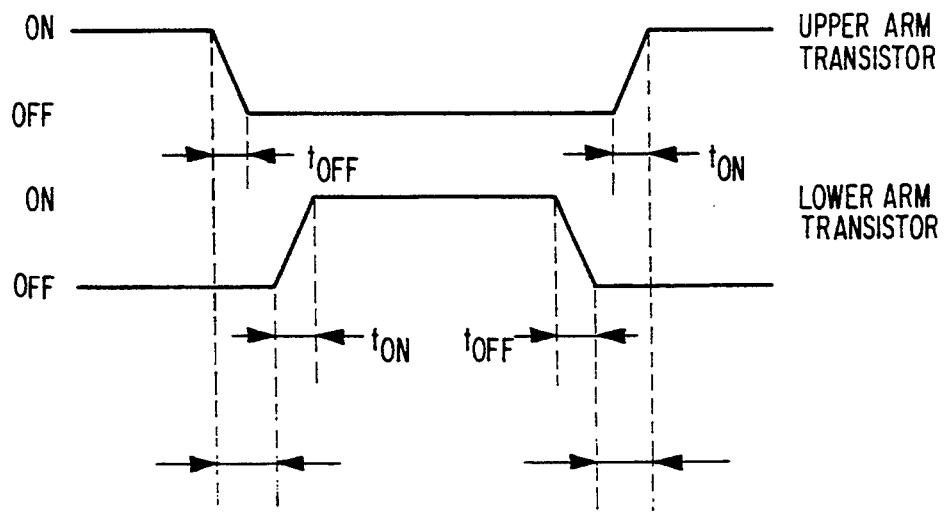
FIG. 7 is a waveform diagram illustrating the operational states of the upper and lower arm transistors of an inverter according to the present invention.

Ideally, the transistors in the main circuit 20 are switched OFF at the beginning of the short-circuit prevention period output by the generator 29. In practice, however, the time delays inherent in the transistors switching from the ON to OFF states during the operation of the inverter main circuit 20, shown as $T_{ON}$ and $T_{OFF}$ in FIG. 7, cause the actual short-circuit prevention period to shift, thereby resulting in a change in the actual output voltage error. To properly compensate for this actual output voltage error, the fact that the ON and OFF operations are not performed simultaneously must be further taken into consideration. The time both the upper and lower arm transistors are actually in their OFF states can be represented by the following equation:

$$Tb' = Tb - (T_{ON} - T_{OFF}) \qquad (2)$$

Figure 8:
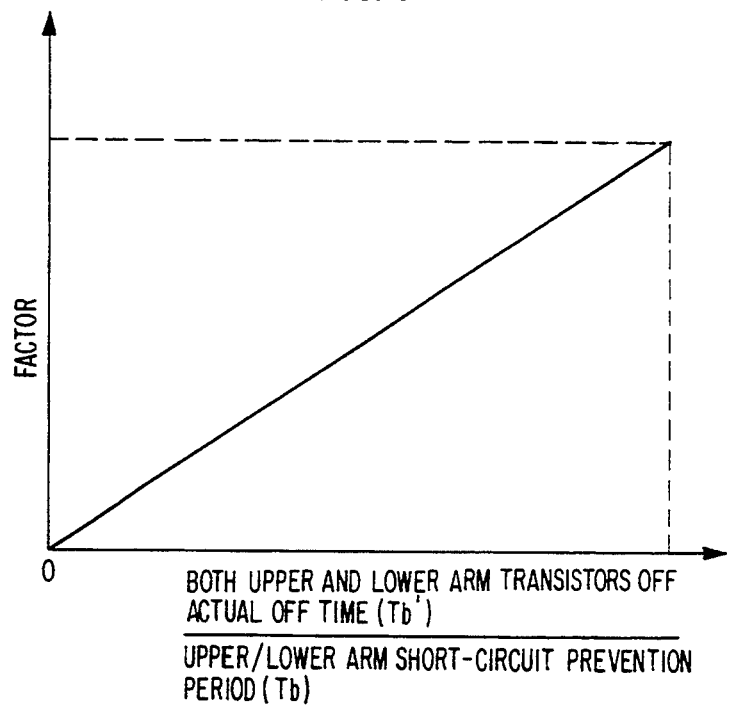
FIG. 8 illustrates a relationship between the actual OFF time of the upper and lower arm transistors and the ideal short-circuit prevention period.
Figure 11:
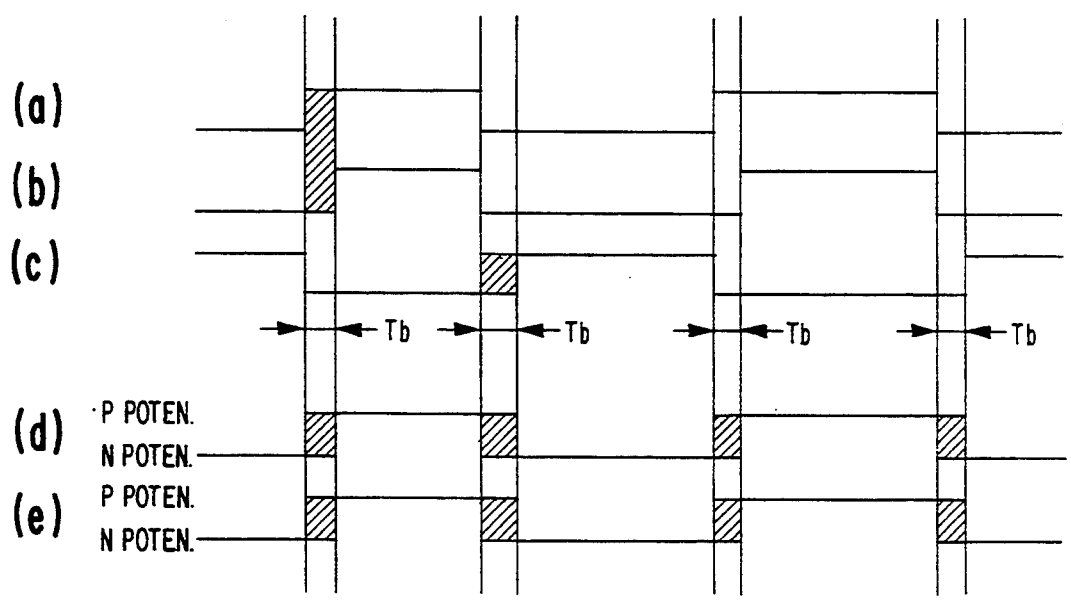
FIG. 11 is a waveform diagram illustrating the operation of the control circuit shown in FIG. 10.

The relationship between the actual and preset short-circuit prevention periods can be represented by a factor k from the graph shown in FIG. 8 and the following equation:

$$k = \{Tb - (T_{ON} - T_{OFF})\}/Tb = Tb'/Tb \qquad (3)$$

It should be noted that the values for $T_{ON}$ and $T_{OFF}$ are provided by sampling the transistors in the main circuit 20 prior to operation of the present invention.

Figure 9:
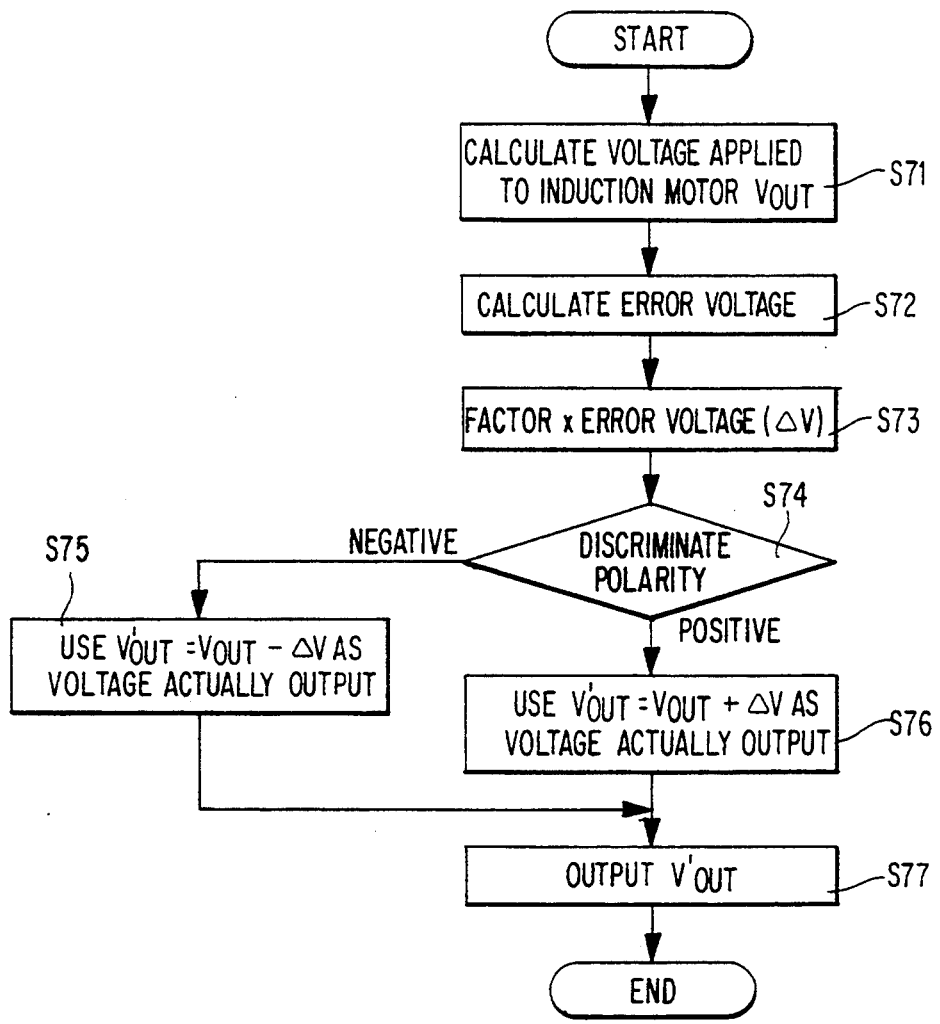
FIG. 9 is a flowchart illustrating the operation of a voltage compensator device in accordance with another embodiment to the present invention.
Figure 10:
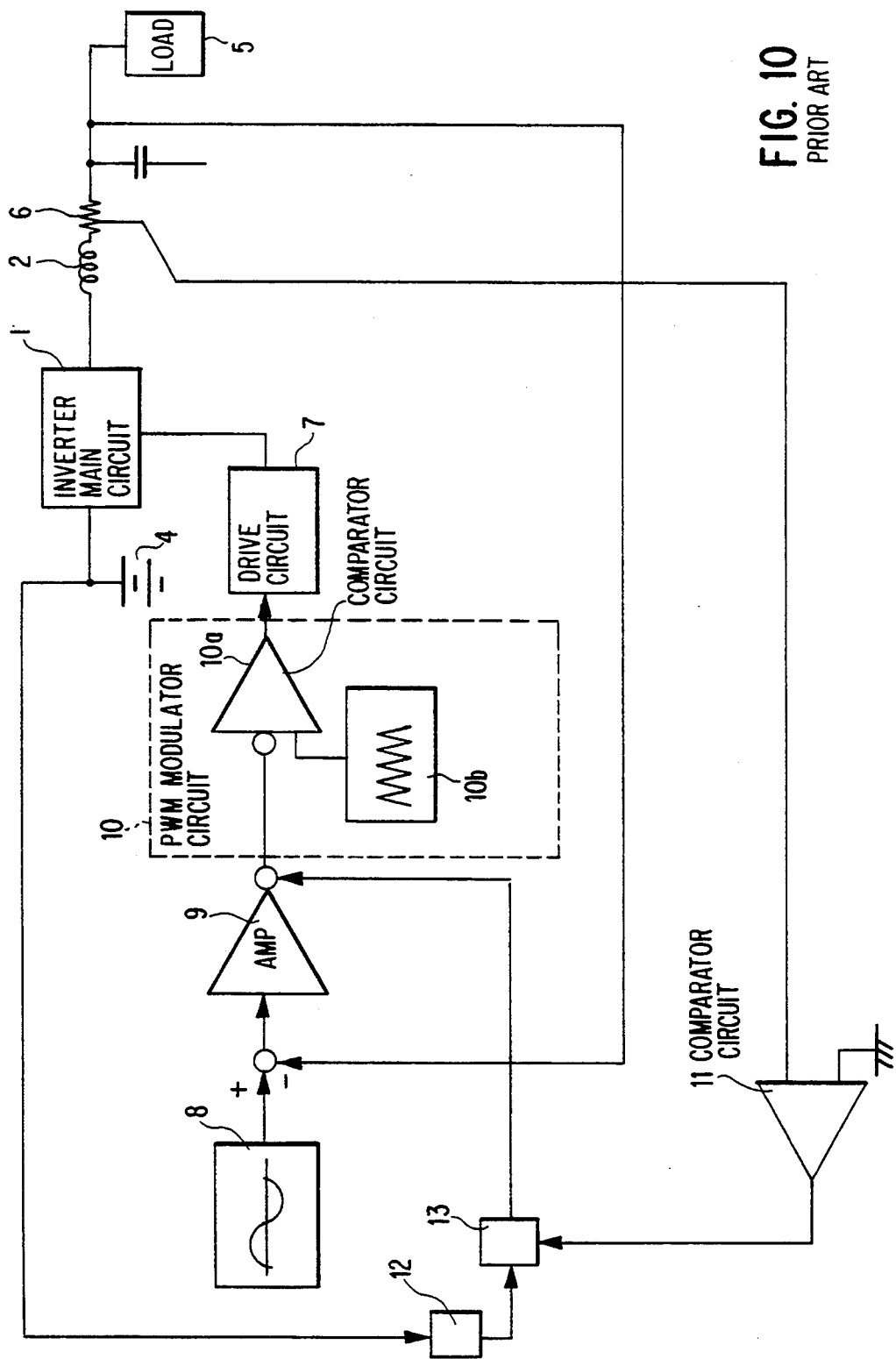
FIG. 10 is a block diagram illustrating the structure of a known control circuit having an output voltage compensator for an inverter.
Figure 12:
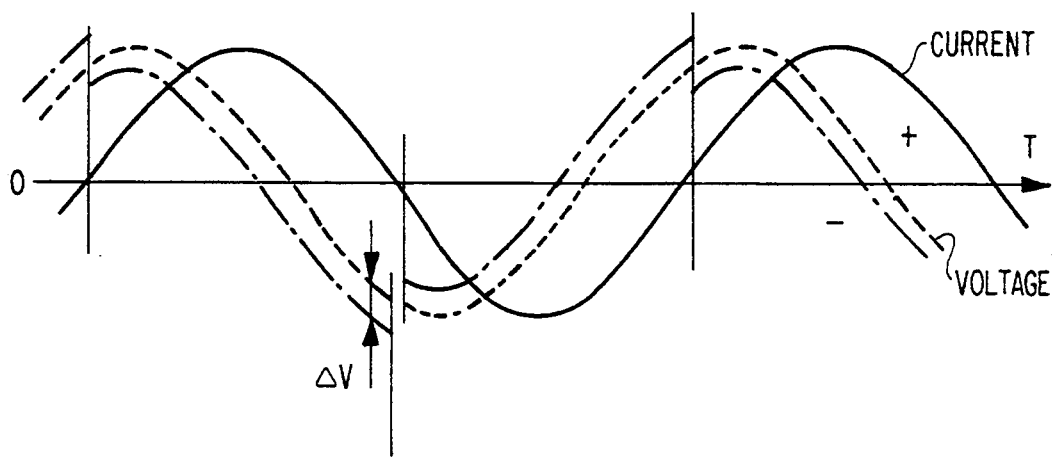
FIG. 12 is a current and voltage waveform diagram illustrating the output current and voltage waveforms of the control circuit shown in FIG. 10.

In accordance with another embodiment of the present invention, as shown in FIG. 9, the output voltage $V_{OUT}$ to be output by the inverter main circuit 20 is calculated by the calculating device 25 (step S71). The voltage compensator device 27 then calculates the output voltage error $\Delta V$ using equation (1) above, and compensates the output voltage error $\Delta V$ by using the precalculated factor k, thereby calculating the output voltage error corresponding to the time the upper and lower arm transistors are actually OFF (steps S72 and S73). Then, the voltage compensator device 27 checks the polarity of the output current (step S74). If the polarity of the output current is positive, the voltage compensator device 27 compensates for the output voltage error by employing a voltage $V_{OUT} + \Delta V$ as the voltage to be actually output by the inverter main circuit 20 ($V'_{OUT}$) (step S76).

If the polarity of the output current is negative, $V_{OUT} - \Delta V$ is used as the voltage actually output by the inverter main circuit 20 ($V'_{OUT}$) (step S75).

After the voltage compensator device 27 has compensated for the output voltage as described above, the PWM circuit 28 and the short-circuit prevention period generator generate and output the upper/lower arm short-circuit prevention period in accordance with the compensation voltage value so that the inverter main circuit 20 may output the predetermined voltage in the positive and negative regions (step S77). Thus, in accordance with the present embodiment, the voltage compensator device 27 further compensates the output voltage error $\Delta V$ by using the precalculated factor k, thereby calculating the output voltage error corresponding to the time the upper and lower arm transistors are actually in their OFF states. Then, as in the previous embodiment, the output voltage is compensated for on the basis of the voltage error with the polarity of the output current taken into account.

In accordance with yet another embodiment of the present invention, the voltage employed to compensate for the output voltage error of the inverter main circuit 20 may be a value which includes the voltage drops across the upper and lower arm transistors and diodes D of the main circuit 20. It should be noted that the forward voltage drop of each transistor and diode D may be predetermined by sampling prior to operation of the present invention. Thus, if the polarity discriminating device 26 determines that the output current is positive and the upper arm transistors of the main circuit 20 are in their ON states, the voltage compensator device 27 can compensate the output voltage error for the amount of voltage attributed to the output voltage drops across the upper arm transistors ($V_{Tr}$) and the lower arm transistors ($V_D$). When the output current is positive, the output voltage of the main circuit 20 drops in the amount of the voltage drop across the upper arm transistors when the same are in their ON states. When the lower arm transistors are in their ON states, the output voltage of the main circuit 20 drops in the amount of the voltage drop across the diodes D. Accordingly, the voltage compensator device 27 compensates the output voltage error by adding a voltage in the amount of $(V_{Tr} + V_D)/2$ to the voltage $V'_{OUT}$. A similar compensation operation is performed when the output current is negative.

Figure 13:
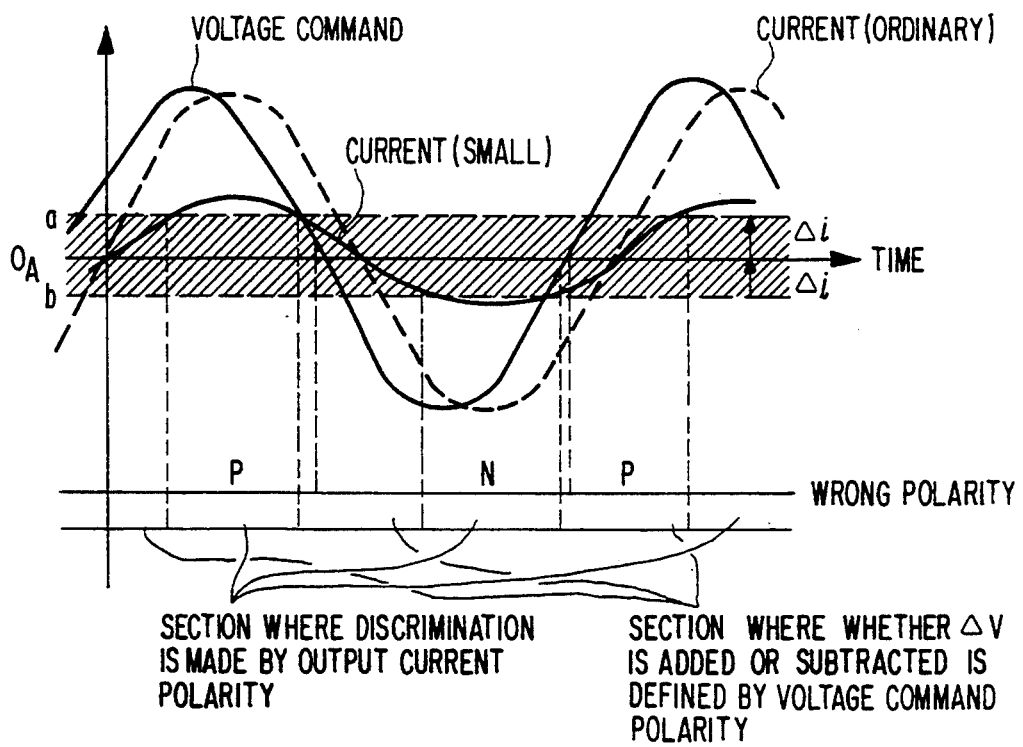
FIG. 13 is a waveform diagram illustrating the differences between a small inverter output signal and an ordinary inverter output signal.

In the embodiments described above, the output voltage of the inverter is compensated for according to a current value $\Delta i$, i.e., the voltage polarity is discriminated in a section where chattering occurs near a zero current and the current polarity is discriminated for a current larger than the threshold value $\Delta i$. However, if, for example, the capacity of a motor is too small as compared to that of the inverter, a wiring length is too long, or the motor temperature is too high, the output current of the inverter is decreased (as shown in FIG. 13). As a result, the chattering decreases in response to the reduced output current of the inverter. Thus, the use of $\Delta i$, as defined in FIG. 3, in determining the polarity of the output current is no longer appropriate. Specifically, the value $\Delta i$ and the corresponding threshold values a and b almost exceed the maxima and minima points of the output current, as shown in FIG. 13. As a result, the threshold values do not aid in accurately determining the output voltage error, and therefore compensation cannot be properly made.

Figure 14:
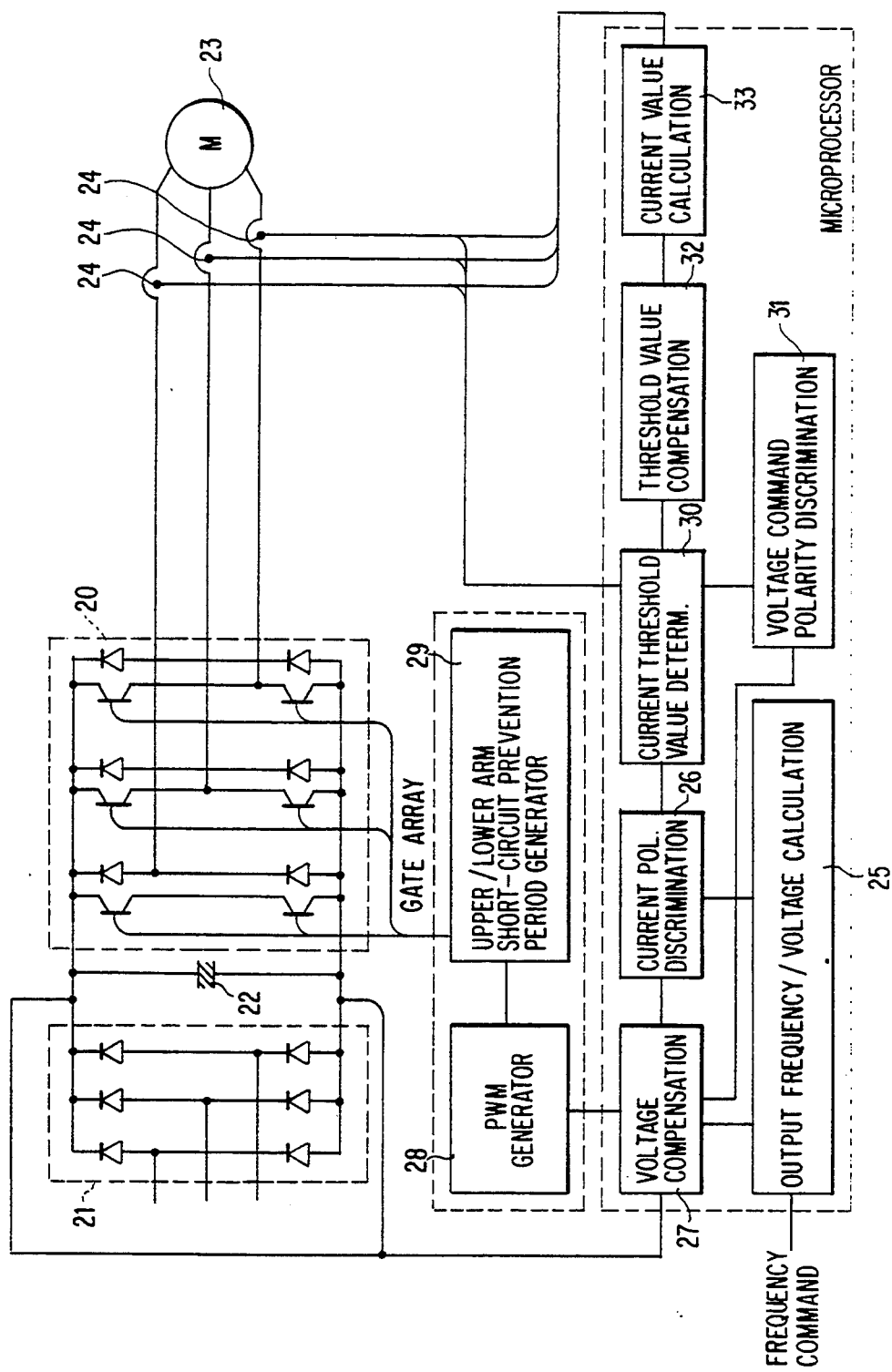
FIG. 14 is a block diagram illustrating the output voltage error compensator according to yet another embodiment of the present invention.

In order to overcome the foregoing problems, another embodiment of the present invention provides a threshold value compensating device 32 for compensating a threshold value according to the magnitude of the output current, as shown in FIG. 14, and a current value calculating device 33 for calculating the magnitude of the output current detected by current detector 24. The threshold value compensating device 32 and the current value calculating device 33, along with a current threshold value determining means 30 and a voltage command polarity discriminating means 31, can be implemented together in the microprocessor making up the frequency/voltage calculating device 25, the current polarity discriminating device 26, and the voltage compensator device 27, as described above.

Figure 15:
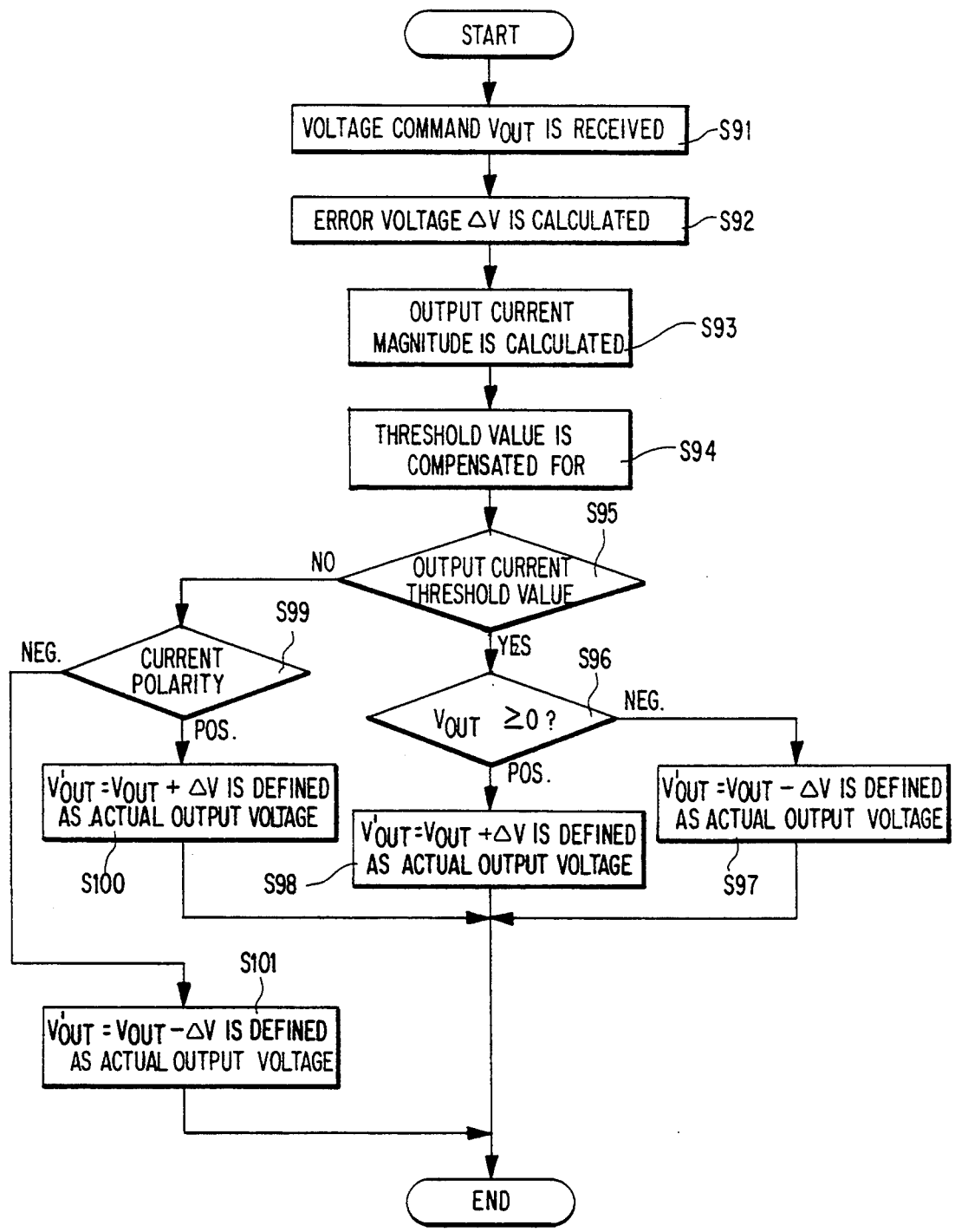
FIG. 15 is a flowchart illustrating the operational flow of the compensator shown in FIG. 14.

The operation of the embodiment shown in FIG. 14 will now be described with reference to the flowchart in FIG. 15. The AC voltage input to the converter 21 is converted into a DC voltage, which is then smoothed by the capacitor 22 and input to the inverter main circuit 20. In the main circuit 20, the bridge-configured transistors are driven under the control of a drive signal output from the upper/lower arm short-circuit prevention period generator 29, whereby the DC voltage is converted into an AC voltage having a predetermined frequency and voltage, which is then applied to the induction motor 23.

Meanwhile, a voltage command $V_{OUT}$ is output by the calculating device 25 and received by the voltage compensator 27 (step S91). The voltage compensator 27 then calculates an output voltage error $\Delta V$ (step S92). The AC output current value detected by detector 24 is converted into a DC value by converting stator coordinates into rotor coordinates (d-q cartesian coordinates) in accordance with equation (4) below:

$$\begin{bmatrix} id \\ iq \end{bmatrix} = \sqrt{2} \begin{bmatrix} \sin\left(\theta + \frac{\pi}{3}\right) & \sin\theta \\ \sin\left(\theta + \frac{5}{6}\pi\right) & \sin\left(\theta + \frac{\pi}{2}\right) \end{bmatrix} \begin{bmatrix} iu \\ iv \end{bmatrix}$$

where $\theta$ represents a voltage phase. The magnitude of the DC current value is determined in accordance with equation (5) below:

$$|I| = \frac{\sqrt{id^2 + iq^2}}{\sqrt{3}}$$

Figure 16:
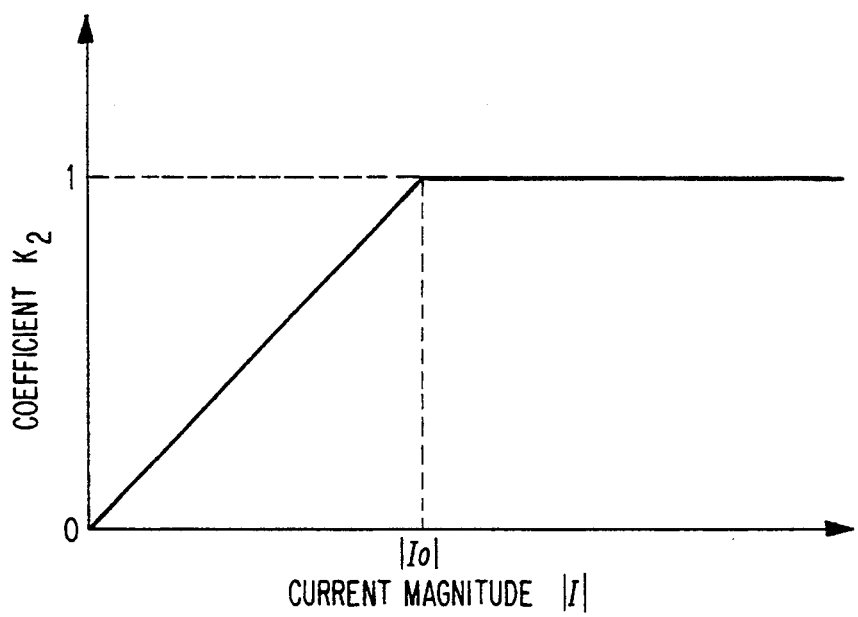
FIG. 16 is a waveform diagram illustrating the relationship between a threshold output current magnitude $|I|$ and a constant $k_2$.

If the output current magnitude is smaller than a reference current magnitude $|I_o|$, a threshold value is compensated for by multiplying the reference threshold value $\Delta io$ by coefficient $k_2$ (given by FIG. 16) in accordance with the following equation:

$$\Delta i' = k_2 \times \Delta io \qquad (6)$$

It should be noted that the reference threshold value $\Delta io$ and corresponding magnitude $|Io|$ may be derived from, for example, the relationship of output current to output frequency shown in FIG. 3.

The current threshold value determining device 30 determines whether the absolute value of the output current is smaller than the set threshold value $\Delta i'$ (step S95). When the absolute value of the output current is determined to be greater than the threshold value, the outputs of the current detectors 24 are input to the current polarity discriminating device 26 to discriminate the polarity of the output current (step S99). When the polarity of the output current is determined to be positive, the voltage error $\Delta V$ is added to the voltage command $V_{OUT}$ by the voltage compensator device 27, and the result of addition $V'_{OUT}$ is defined as an actual output voltage to be output by main circuit 20 (step S100). Conversely, when the polarity of the output current is determined to be negative, the voltage error $\Delta V$ is subtracted from the voltage command $V_{OUT}$ and the result of subtraction $V'_{OUT}$ is defined as an actual output voltage (step S101).

When the current threshold value determining device 30 determines, however, at step S95, that the absolute value of the output current is smaller than the threshold value $\Delta i$, the output current polarity is ignored and the polarity of the voltage command $V_{OUT}$ is discriminated by the voltage command polarity discriminating device 32 (step S96). When the polarity of the voltage command is determined to be positive, the voltage error $\Delta V$ is added to the voltage command $V_{OUT}$ by the voltage compensator device 27 and the result of addition $(V'_{OUT})$ is defined as an actual output voltage (step S98). Conversely, when the polarity of the voltage command is determined to be negative, the voltage error $\Delta V$ is subtracted from the voltage command $(V_{OUT})$ by the voltage compensator device 27 and the result of subtraction $V'_{OUT}$ is defined as the actual output voltage (step S97).

Figure 17:
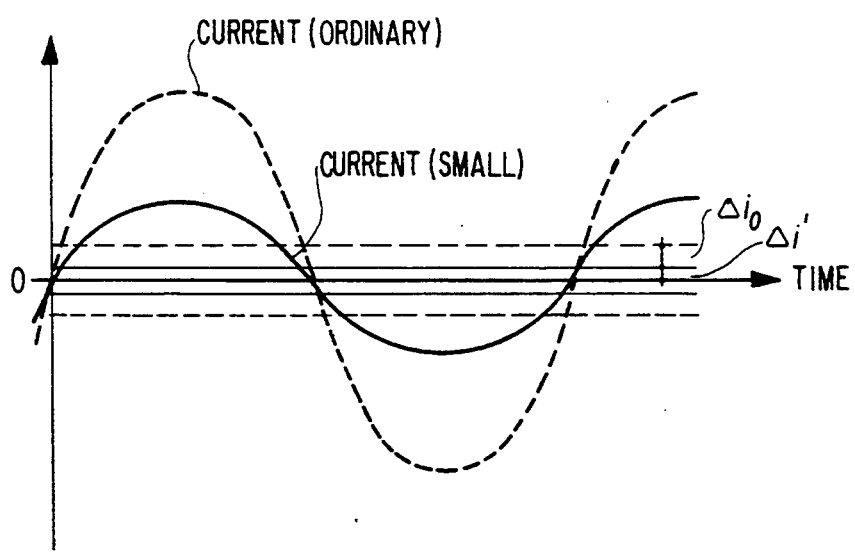
FIG. 17 is a waveform diagram illustrating a compensated threshold output current value $\Delta i'$ used for a small inverter output signal.

When the absolute value of the output current is smaller than the threshold value as described above, i.e., since the polarity of the output current is not checked near a zero current, the chattering of the current near zero is ignored. Whether the voltage error is added or subtracted can be further defined, and if the output current is small, the threshold value $\Delta io$ is compensated for, as shown in FIG. 17, to prevent erroneous polarity discrimination from being made.

It will be apparent that the present invention, as described above, achieves an inverter output voltage error compensator designed to accurately discriminate the polarity of the output current of the inverter main circuit, ensuring proper compensation for the voltage error due to the short-circuit prevention period.

It will also be apparent that the compensator of the prevent invention provides compensation on the basis of the voltage error generated in response to the actual operational short-circuit prevention period of the inverter main circuit, thereby offering a more accurate output voltage.

It will further be apparent that the compensator of the present invention compensates for an voltage error attributable to an upper/lower short-circuit prevention period by employing either of the polarity of an output current and that of a voltage command. The compensator compensates for a threshold value employed to switch between output current polarity discrimination and voltage command polarity discrimination according to the magnitude of the output command, thereby providing proper compensation for the voltage error.

What is claimed is:

1. An output voltage error compensator, which is used in an inverter that converts input direct current (DC) power into alternating current (AC) power serving a load, for compensating for an output voltage error of the inverter, said output voltage error compensator comprising:

current detector means for detecting the output current of said inverter;

polarity discriminating means for discriminating, including during a short-circuit prevention period, the polarity of the inverter output current detected by said current detector means, said polarity discriminating means including a setting means for setting a constant threshold value relative to the output current; and voltage compensator means for compensating for said output voltage error occurring in the output of said inverter based on the discriminated polarity of said output current.

2. The output voltage error compensator defined in claim 1, wherein said constant threshold value is automatically set in response to the output frequency of the inverter, said voltage compensator using said threshold value to detect said constant output current polarity by setting said threshold value higher than ripples found in said output current of said inverter.

3. The output voltage error compensator defined in claim 2, further comprising a frequency/voltage calculating means for receiving an external frequency command indicative of the frequency at which the output voltage of said inverter should be generated, calculating and generating signals indicative of the output frequency and a corresponding output voltage, wherein a ratio of said output frequency and output voltage is maintained as a constant.

4. The output voltage error compensator defined in claim 1, wherein said inverter comprises a plurality of transistors for converting DC power into AC power, said compensator further comprising a driving means for driving said transistors to a simultaneous OFF state during a short-circuit prevention period so as to prevent a simultaneous ON state of said transistors.

5. The output voltage error compensator defined in claim 4, further comprising OFF state determining means for determining an actual period of time in which said plurality of transistors in said inverter are simultaneously in their OFF states, wherein said voltage compensator means uses said actual period of time to determine a compensation factor used to compensate the output voltage error with respect to the time said plurality of transistors are actually in their OFF states during said short-circuit prevention period.

6. The output voltage error compensator defined in claim 4, wherein said voltage compensator means takes into account voltage drops across said plurality of transistors in compensating for said output voltage error of said inverter.

7. The output voltage error compensator defined in claim 4, wherein in response to a detection of output current magnitude less than the threshold value set by said polarity discriminating means, said voltage compensator means compensates for said output voltage error on the basis of the polarity of an output voltage output by a frequency/voltage calculating means for calculating said output voltage so that (output voltage)/(output frequency) is constant.

8. The output voltage error compensator defined in claim 1, wherein said load is a multi-phase induction motor.

9. An inverter output voltage error compensator for compensating for an output voltage error in the output voltage of an inverter used for converting direct current into alternating current, said compensator comprising:
  a current detector device detecting the output current of said inverter;
  a current polarity discriminating device discriminating, including during a short-circuit prevention period, the polarity of the inverter output current detected by said current detector device;
  a current threshold value determining device determining whether the value of the output current is larger or smaller than a set constant threshold value;
  a voltage command polarity discriminating device discriminating the polarity of a voltage command;
  a current value calculating device calculating the magnitude of the output current from the output current detected by said current detector device; and
  a threshold value compensator device compensating for said constant threshold value according to the magnitude of the output current calculated by said current value calculating device;
  wherein the output voltage error of the inverter is compensated for on the basis of said constant threshold value by either of the polarity of the current detected or the polarity in the output voltage command value, said constant threshold value being automatically compensated for according to the magnitude of the output voltage of said inverter.

10. In an output voltage error compensator, which is used in an inverter that converts input direct current (DC) power into alternating current (AC) power serving a load, for compensating for an output voltage error of the inverter, a method of compensating for said output voltage error comprising the steps of:
  detecting an output current of said inverter;
  discriminating the polarity of the inverter output current detected by said detecting step, including during a short-circuit prevention period, said discriminating step including a step of setting a constant threshold value relative to the output current; and
  compensating for said output voltage error occurring in the output of said inverter based on the discriminated polarity of said output current.

11. The method of compensating as defined in claim 10, where said setting step includes a step of automatically setting the constant threshold value in response to the output frequency of the inverter, wherein said constant threshold value is set higher than a ripple level found in said output current of said inverter at said output frequency.

12. The method of compensating as defined in claim 11, further comprising steps of receiving an external frequency command indicative of the frequency at which the output voltage of said inverter should be generated, and generating signals indicative of the output frequency and a corresponding output voltage, wherein a ratio of said output frequency and output voltages is maintained as a constant.

13. The method of compensating as defined in claim 10, wherein said inverter comprises a plurality of transistors for converting DC power into AC power, said method further comprising the step of driving said transistors to a simultaneous OFF state during a short-circuit prevention period so as to prevent a simultaneous ON state of said transistors.

14. The method of compensating as defined in claim 13, further comprises a step of determining an actual period of time in which said plurality of transistors in said inverter are simultaneously in their OFF states, wherein said compensating step includes the step of using said actual period of time in determining a compensation factor used to compensate the output voltage error with respect to the time said plurality of transistors are actually in their OFF states during said short-circuit prevention period.

15. The method of compensating as defined in claim 13, wherein said compensating step further includes a step of taking into account voltage drops across said plurality of transistors in compensating for said output voltage error of said inverter.

16. The method of compensating as defined in claim 13, wherein said compensating step further includes a step of, in response to a detection of output current magnitude less than the constant threshold value set by said discriminating step, compensating for said output voltage error on the basis of an output voltage output by a calculating step for calculating said output voltage so that (output voltage)/(output frequency) is constant.

* * * * *